United States Patent Office 3,410,872
Patented Nov. 12, 1968

3,410,872
B-HOMO-19-NOR-PREGNENE-3,20-DIONES
AND DERIVATIVES THEREOF
John A. Edwards, Palo Alto, Calif., assignor to Syntex
Corporation, Panama, Panama, a corporation of
Panama
No Drawing. Filed July 19, 1965, Ser. No. 473,239
21 Claims. (Cl. 260—340.5)

ABSTRACT OF THE DISCLOSURE

Novel B-homo-19-nor-21-unsubstituted-$\Delta^4$ and $\Delta^{5(10)}$-pregnene-3,20-diones and B-homo-19-nor-21-unsubstituted-$\Delta^{4,9(10)}$-pregnadiene-3,20-diones useful as progestational agents.

This invention relates to novel cyclopentanopolyhydrophenanthrene derivatives and to processes for the preparation thereof.

More particularly, this invention relates to novel B-homo - 19 - nor - 21 - unsubstituted - $\Delta^4$ - and - $\Delta^{5(10)}$- pregnene-3,20-diones represented by the general formula:

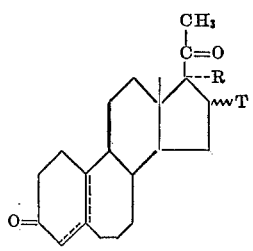

(A)

and also to novel B-homo-18-nor-21-unsubstituted-$\Delta^{4,9(10)}$-pregnadiene-3,20-diones represented by the general formula:

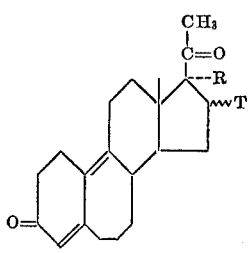

(B)

In the above formulas, R represents hydrogen, a hydroxyl group or an acyloxy group; T represents hydrogen, α-hydroxyl, α-acyloxy, α-methyl or β-methyl; R and T taken together can also represent the grouping:

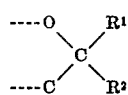

wherein $R^1$ represents hydrogen or a lower alkyl group, such as methyl, ethyl, propyl, butyl, or the like and $R^2$ represents hydrogen, a lower alkyl group, or an aryl (including alkaryl and aralkyl) group containing up to 8 carbon atoms, inclusive, such as phenyl, tolyl, xylyl, benzyl, or the like, and the dotted lines indicate that there is one double bond at either the 4(5)- or the 5(10)-position.

The acyl and acyloxy groups referred to herein are preferably derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel B-homo steroids represented by the above formulas are progestational agents having anti-androgenic, anti-estrogenic, anti-gonadotropic, and diuretic properties. In addition, they can be used in fertility control, in the treatment of premenstrual tension, and in lowering blood cholesterol levels.

One suitable procedure which can be used to prepare the novel B-homo-19-nor-21-unsubstituted-$\Delta^4$-pregnene-3,20-diones represented by Formula A hereinabove can be represented schematically as follows:

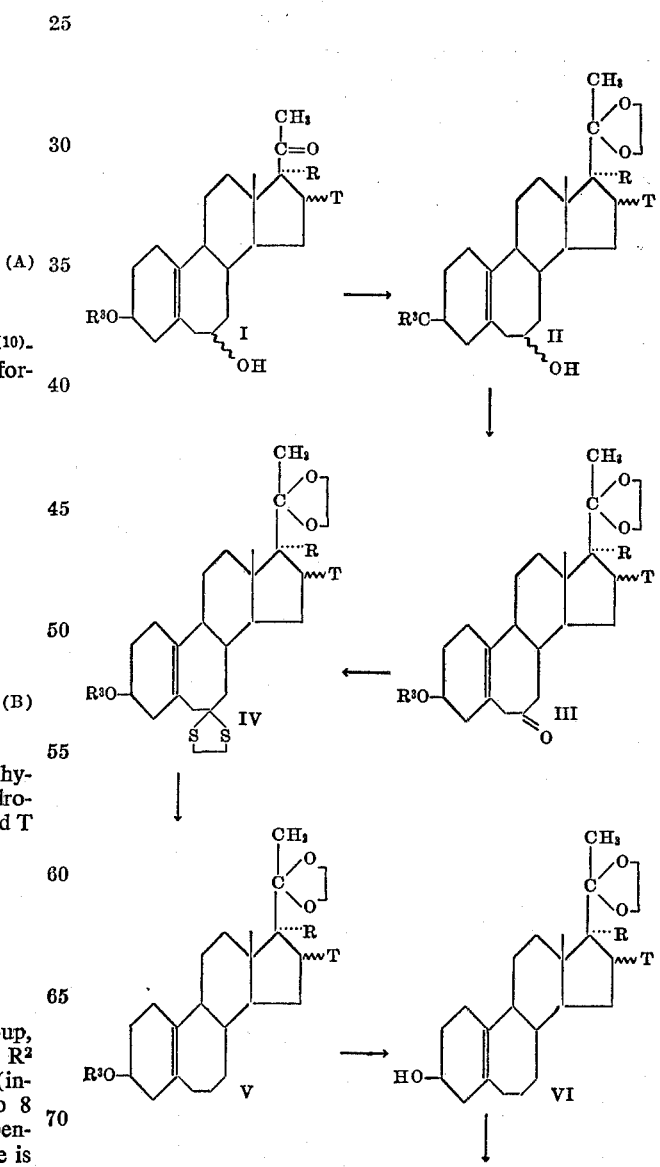

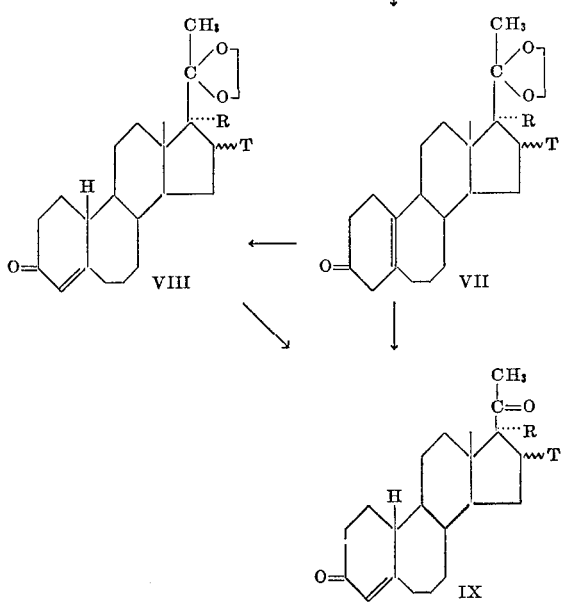

In these formulas R and T have the same meanings as set forth hereinabove and $R_3$ represents an acyl group.

In carrying out this procedure the starting material I, a B-homo-19-nor-$\Delta^{5(10)}$-pregnene-3β,7(α or β)-diol-20-one 3-acylate, e.g., B-homo-19-nor-$\Delta^{5(10)}$-pregnene-3β,7β-diol-20-one 3-acetate (I; R and T=hydrogen, $R^3$=acetyl), obtained as described in my copending U.S. patent application Ser. No. 423,566, filed Jan. 5, 1965, now abandoned, is first ketalized in known manner with a lower alkylene glycol, such as ethylene glycol, propylene glycol, or the like, to give the corresponding 20-ketal, e.g., B-homo-19-nor - 20 - cycloethylenedioxy-$\Delta^{5(10)}$-pregnene-3β,7β-diol-3-acetate (II; R and T=hydrogen, $R^3$=acetyl).

Next, the 7-hydroxyl group in this 20-ketal is oxidized, using chromium trioxide in pyridine, or the like, preferably at room temperature (about 25° C.) overnight, to give the corresponding 7-keto steroid, e.g. B-homo-19-nor-20-cycloethylenedioxy-$\Delta^{5(10)}$-pregnen - 3β-ol-7-one 3-acetate (III; R and T=hydrogen, $R^3$=acetyl).

This 7-keto steroid is then reacted in known manner with a lower alkylene dithiol, such as ethane dithiol, propane dithiol, or the like, to give the corresponding 7-cycloalkylenedithio ketal, e.g., B-homo-7-cycloethylene-dithio-19-nor-20-cycloethylenedioxy - $\Delta^{5(10)}$ - pregnen-3β-ol 3-acetate (IV; R and T=hydrogen, $R^3$=acetyl).

The resulting 7-cycloalkylenedithio ketal, dissolved in a lower alkanol, such as methanol, ethanol, or the like, is then refluxed with Raney nickel for from about 8 to about 24 hours, thus producing the corresponding 7-unsubstituted steroid, e.g., B-homo - 19 - nor - 20 - cycloethylenedioxy-$\Delta^{5(10)}$-pregnen-3β-ol 3-acetate (V; R and T=hydrogen, $R^3$=acetyl).

Hydrolysis of the 3-acyl group is this 7-unsubstituted steroid, e.g., by refluxing it in aqueous methanolic potassium hydroxide, gives the corresponding free 3β-hydroxy compound, e.g., B - homo - 19 - nor - 20 - cycloethylenedioxy-$\Delta^{5(10)}$-pregnen-3β-ol (VI; R and T=hydrogen).

Oxidation of the 3-hydroxyl group in the thus-obtained free 3β-hydroxyl compound, using chromium trioxide in pyridine, or the like, in the manner described hereinabove, produces the corresponding 3-keto steroid, e.g., B-homo-19-nor-20-cycloethylenedioxy-$\Delta^{5(10)}$-pregnen-3-one (VII; R and T=hydrogen).

By refluxing the resulting $\Delta^{5(10)}$-3-one with an aqueous methanolic solution of sodium hydroxide, potassium hydroxide, or the like, preferably of from about 0.01 N to about 0.1 N, under an inert nitrogen atmosphere, for from about one to about six hours, the double bond can be shifted from the 5(10)- to the 4-position without removal of the 20-ketal group, thus giving, for example, B-homo-19-nor-20-cycloethylenedioxy-$\Delta^4$-pregnen - 3-one (VIII; R and T=hydrogen).

Preferably, however, the double bond will be shifted at the same time the 20-keto group is regenerated, by dissolving the 20-cycloalkylenedioxy-$\Delta^{5(10)}$-3-one (VII) in an inert organic solvent, preferably a ketone such as acetone, methyl ethyl ketone, methyl isobutyl ketone, or the like, and refluxing with a strong acid, such as sulfuric acid, hydrochloric acid, p-toluenesulfonic acid, or the like, thus producing the corresponding $\Delta^4$-3,20-dione, e.g., B-homo-19-nor-$\Delta^4$-pregnene-3,20-dione (IX; R and T=hydrogen), directly. This procedure can also be used to regenerate the 20-keto group in the corresponding 20-cycloalkylenedioxy-$\Delta^4$-3-one (VIII).

One suitable procedure which can be used to prepare the novel B - homo - 19 - nor - 21 - unsubstituted - $\Delta^{5(10)}$-pregnene-3,20-diones of Formula A hereinabove and the novel B-homo-19-nor-21-unsubstituted - $\Delta^{4,9(10)}$ - pregnadiene-3,20-diones of Formula B hereinabove can be represented schematically as follows:

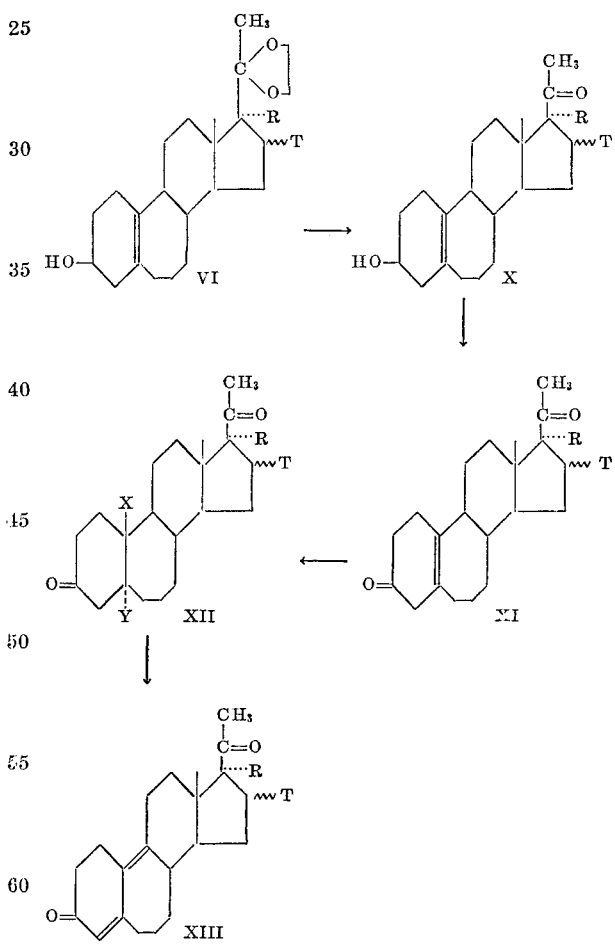

In these formulas R and T have the same meanings as set forth hereinabove, X represents chlorine, bromine or iodine and Y represents chlorine or bromine.

In carrying out this procedure the starting material (VI), a B-homo-19-nor - 20 - cycloalkylenedioxy-$\Delta^{5(10)}$-pregnen-3β-ol, e.g., B-homo-19-nor - 20 - cycloethylenedioxy-$\Delta^{5(10)}$-pregnen-3β-ol (VI; R and T=hydrogen), obtained as described hereinabove, is dissolved in an inert organic solvent and refluxed with a strong acid, in the same manner described hereinabove for the regeneration of the 20-keto group in the corresponding 20-cycloalkylenedioxy-$\Delta^{5(10)}$-3-one (VII) or -$\Delta^4$-3-one (VIII), thus giving the corresponding $\Delta^{5(10)}$-pregnen-3β-ol-20-one (X; R and T=hydrogen).

Oxidation of the free 3β-hydroxyl group in the thus-obtained $\Delta^{5(10)}$-3β-ol-20-one, using chromium trioxide in pyridine, or the like, in the manner described hereinabove, produces the corresponding $\Delta^{5(10)}$ - 3,20 - dione, e.g., B-homo - 19 - nor - $\Delta^{5(10)}$-pregnene-3,20-dione (XI; R and T=hydrogen).

This $\Delta^{5(10)}$-3,20-dione is then dihalogenated to produce the corresponding 5α,10β-dihalo steroid, e.g., B-homo-5α,10β-dibromo-19-norpregnane-3,20-dione (XII; R and T=hydrogen).

Where the halogens introduced at the 5- and 10-positions are the same, i.e., two chlorine atoms or two bromine atoms, the reaction can be carried out as described in U.S. Patent No. 3,086,027 to Perelman et al., or as described in copending U.S. patent application Ser. No. 107,050, filed May 2, 1961, now U.S. Patent 3,139,-446, using chlorine or bromine in liquid or gaseous form, or any other chlorinating or brominating agent or chlorine or bromine carrier which liberates chlorine as Cl+, Cl− or bromine as Br+, Br−, such as N-chloroacetamide or N-chlorosuccinimide together with hydrogen chloride, N-bromoacetamide or N-bromosuccinimide together with hydrogen bromide, trimethylammonium bromide perbromide, pyridine perbromide hydrobromide, or the like, in an inert organic solvent such as pyridine or a substituted pyridine base, methylene dichloride, carbon tetrachloride, or the like.

Where the halogens introduced at the 5- and 10-carbon atoms are different, the reaction will be carried out as described in the aforementioned copending U.S. patent application Ser. No. 107,050, using a halogen halide, e.g., bromine chloride, iodine chloride, or the like, which can be generated in situ from a mixture of an N-haloamide or N-haloimide, such as N-chloro-, N-bromo- or N-iodoacetamide or N-chloro, N-bromo, or N-iodosuccinimide, or the like, with hydrogen chloride or hydrogen bromide, e.g., mixtures of N-bromoacetamide and hydrogen chloride, N-iodosuccinimide and hydrogen chloride, and the like, in an inert organic solvent, such as one or more of those mentioned hereinabove.

The temperature at which this halogenation reaction is carried out will vary depending on the halogenating agent or halogen carrier used. Thus, where a halogenating agent or halogen carrier other than a mixture of an N-haloamide or -imide and a hydrogen halide is used, the reaction will generally be carried out at a temperature of about 5° C. or lower, and preferably at from about −20° C. to about 0° C., although in certain cases temperatures up to room temperature can be employed. Where the halogenating agent is a mixture of an N-haloamide or -imide and a hydrogen halide, the reaction will preferably be carried out at a temperature of about −20° C. or less, e.g., temperatures as low as −80° C. can be employed.

The thus-obtained 5α,10β-dihalo steroid (XII) is then admixed with a pyridine base solvent, such as pyridine itself, collidine, lutidine, or the like, and reacted at a temperature of about 20° C. to about 30° C. or higher, and preferably at room temperature, under substantially anhydrous conditions, to split out 2 mols of hydrogen halide and give the corresponding $\Delta^{4,9(10)}$-diene, e.g., B-homo-19-nor-$\Delta^{4,9(10)}$-pregnadiene-3,20-dione (XIII; R and T=hydrogen).

In order that those skilled in the art can more fully understand the present invention, the following examples are set forth. These examples are given solely for the purpose of illustrating the invention, and should not be considered as expressing limitations unless so set forth in the appended claims.

Example I

A mixture of 1 gram of B-homo-19-nor-$\Delta^{5(10)}$-pregnene-3β,7β-diol-20-one 3-acetate, 25 cc. of anhydrous, thiophene-free benzene, 5 cc. of ethylene glycol and 50 mg. of p-toluenesulfonic acid monohydrate was refluxed for 16 hours with distillation of the water formed during the reaction. Following this reaction period the reaction mixture was washed with an aqueous sodium bicarbonate solution, then with water, then dried over anhydrous sodium sulfate, and finally evaporated to dryness. Recrystallization from acetone/hexane gave B-homo-19-nor-20-cycloethylenedioxy-$\Delta^{5(10)}$-pregnene-3β,7β-diol 3-actate.

This procedure was then repeated in every detail but one, namely, B-homo - 19 - nor-$^{5(10)}$-pregnene-3β,7β-diol-20-one 3-acetate was replaced by: B-homo-19-nor-$\Delta^{5(10)}$-pregnene-3β,7α,17α-triol-20-one 3-acetate, B-homo-16α-methyl-19-nor-$\Delta^{5(10)}$-pregnene-3β,7β-diol-20 - one 3 - acetate, B-homo-16β-methyl-19-nor-$\Delta^{5(10)}$ - pregnene - 3β,7α-diol-20-one 3-acetate, B-homo-16α-methyl-19-nor-$\Delta^{5(10)}$-pregnene-3β,7β,17α-triol-20-one 3-acetate, and B-homo-16α,17α-isopropylidenedioxy-19-nor-$\Delta^{5(10)}$ - pregnene - 3β, 7α-diol-20-one 3-acetate.

In each case, the corresponding 20-cycloethylenedioxy steroid, namely, B-homo-19-nor-20-cycloethylenedioxy-$\Delta^{5(10)}$-pregnene-3β,7α,17α-triol 3-acetate, B - homo - 16α-methyl - 19-nor-20-cycloethylenedioxy-$\Delta^{5(10)}$-pregnene-3β, 7β - diol 3-acetate, B-homo-16β-methyl-19-nor-20-cycloethylenedioxy-$\Delta^{5(10)}$-pregnene-3β,7α - diol 3 - acetate, B-homo - 16α - methyl - 19-nor-20-cycloethylenedioxy-$\Delta^{5(10)}$-pregnene-3β,7β,17α-triol 3-acetate, and, B - homo - 16α, 17α - isopropylidenedioxy - 19-nor-20-cycloethylenedioxy-$\Delta^{5(10)}$-pregnene-3β,7α-diol 3-acetate, respectively, was obtained.

Example II

A solution of 6 grams of B-homo-19-nor-20-cycloethylenedioxy-$\Delta^{5(10)}$-pregnene-3β,7β-diol 3-acetate in 120 cc. of pyridine was added to a mixture of 6 grams of chromium trioxide in 120 cc. of pyridine, and the resulting reaction mixture was then allowed to stand at room temperature (25° C.) overnight. Following this reaction period the reaction mixture was diluted with ethyl acetate and then filtered through Celite. The resulting filtrate was washed thoroughly with water, then dried over anhydrous sodium sulfate and evaporated to dryness. Crystallization from acetone/hexane gave B-homo-19-nor-20-cycloethylenedioxy-$\Delta^{5(10)}$-pregnen-3β-ol-7-one 3-acetate.

By repeating this procedure in every detail but one, namely, replacing B-homo-19-nor-20-cycloethylenedioxy-$\Delta^{5(10)}$-pregnene-3β,7β-diol 3-acetate with the remaining 20-cycloethylenedioxy steroids prepared as described in Example I hereinabove, the corresponding 7-ones, namely, B-homo - 19 - nor-20-cycloethylenedioxy-$\Delta^{5(10)}$-pregnene-3β,17α-diol-7-one 3-acetate, B-homo-16α-methyl-19-nor-20 - cycloethylenedioxy - $\Delta^{5(10)}$-pregnene-3β-ol-7-one 3-acetate, B - homo - 16β - methyl-19-nor-20-cycloethylenedioxy - $\Delta^{5(10)}$ - pregnen-3β-ol-7-one 3-acetate, B-homo-16α - methyl - 19 - nor - 20-cycloethylenedioxy-$\Delta^{5(10)}$-pregnene-3β,17α-diol-7-one 3-acetate, and B-homo-16α, 17α - isopropylidenedioxy - 19-nor-20-cycloethylenedioxy-$\Delta^{5(10)}$ - pregnen - 3β-ol-7-one 3-acetate, respectively, were obtained.

Example III

A solution of 5 grams of B-homo-19-nor-20-cycloethylenedioxy - $\Delta^{5(10)}$ - pregnen-3β-ol-7-one 3-acetate in 100 cc. of glacial acetic acid containing 5 cc. of ethanedithiol was admixed with 4 cc. of a saturated solution of hydrogen chloride in acetic acid, and the resulting mixture was then allowed to stand at room temperature for 4 hours. Following this reaction period the reaction mixture was admixed with water and then saturated with ethyl acetate. The resulting extract was washed with an aqueous 5% sodium bicarbonate solution, then with water, then dried over anhydrous sodium sulfate and finally evaporated to dryness. Recrystallization from diethyl ether/hexane gave B-homo-19-nor-7-cycloethylenedithio-20-cycloethylenedioxy-$\Delta^{5(10)}$-pregnen-3β-ol 3-acetate.

This procedure was then repeated in every detail with one exception, namely, B-homo-19-nor-20-cycloethylenedioxy - $\Delta^{5(10)}$ - pregnen-3β-ol-7-one 3-acetate was replaced by the remaining 7-ones obtained as described in Example II hereinabove. In each case, the corresponding 7-cycloethylenedithio derivative, namely, B-homo-7-cycloethylenedithio - 19 - nor - 20-cycloethylenedioxy-$\Delta^{5(10)}$-pregnene-3β,17α-diol 3-acetate, B-homo-7-cycloethylenedithio-16α-methyl-19-nor - 20 - cycloethylenedioxy-$\Delta^{5(10)}$-pregnen-3β - ol 3-acetate, B-homo-7-cycloethylenedithio-16β - methyl - 19-nor-20-cycloethylenedioxy-$\Delta^{5(10)}$-pregnen - 3β-ol 3-acetate, B-homo-7-cycloethylenedithio-16α-methyl-19-nor-20-cycloethylenedioxy - $\Delta^{5(10)}$ - pregnene-3β,17α-diol 3-acetate, and B-homo-7-cycloethylenedithio-16α,17α-isopropylidenedioxy-19-nor - 20 - cycloethylenedioxy-$\Delta^{5(10)}$-pregnen-3β-ol 3-acetate, respectively, were obtained.

Example IV

A solution of 4 grams of B-homo-7-cycloethylenedithio - 19 - nor - 20 - cycloethylenedioxy - $\Delta^{5(10)}$ - pregnen-3β-ol 3-acetate in 3 liters of ethanol (previously distilled from Raney nickel), containing 50 grams of Raney nickel, was refluxed for 6 hours. Following this reaction period the reaction mixture was filtered to remove the Raney nickel, which was then washed with hot ethanol and the washings added to the filtrate. The combined ethanol solution was then evaporated to dryness, and the resulting residue was dissolved in chloroform. This chloroform solution was washed with dilute hydrochloric acid, then with aqueous sodium carbonate solution and finally with water. The solution was then dried over anhydrous sodium sulfate and evaporated to dryness. Crystallization of the thus-obtained residue from acetone/hexane gave B - homo - 19 - nor - 20 - cycloethylenedioxy - $\Delta^{5(10)}$-pregnen-3β-ol 3-acetate.

By repeating this procedure in every detail but one, namely, replacing B-homo-7-cycloethylenedithio-19-nor-20-cycloethylenedioxy-$\Delta^{5(10)}$-pregnen-3β-ol 3-acetate with the remaining 7-cycloethylenedithio derivatives prepared as described in Example III hereinabove, the corresponding 7-unsubstituted steroids, namely, B-homo-19-nor-20-cycloethylenedioxy - $\Delta^{5(10)}$-pregnene-3β,17α-diol 3-acetate, B - homo - 16α - methyl - 19 - nor-20-cycloethylenedioxy-$\Delta^{5(10)}$-pregnen-3β-ol 3-acetate, B-homo-16β-methyl-19-nor-20-cycloethylenedioxy-$\Delta^{5(10)}$-pregnen-3β-ol 3-acetate, B - homo - 16α - methyl - 19 - nor - 20 - cycloethylenedioxy - $\Delta^{5(10)}$ - pregnene-3β,17α-diol 3-acetate, and B-homo-16α,17α - isopropylidenedioxy-19-nor-20-cycloethylenedioxy-$\Delta^{5(10)}$-pregnen-3β-ol 3-acetate, respectively, were obtained.

Example V

A solution of 1 gram of B-homo-19-nor-20-cycloethylenedioxy-$\Delta^{5(10)}$-pregnen-3β-ol 3-acetate in 50 cc. of methanol was admixed with a solution of 500 mg. of potassium hydroxide in 1 cc. of water, and the resulting reaction mixture was refluxed for three hours. Following this reaction period, the reaction mixture was poured into ice water, and the resulting precipitate was collected by filtration, washed with water until neutral, and dried. Recrystallization of the thus-obtained crude material from methylene dichloride/diethyl ether gave B-homo-19-nor-20-cycloethylenedioxy-$\Delta^{5(10)}$-pregnen-3β-ol.

This procedure was then repeated with one exception, namely, B - homo - 19 - nor-20-cycloethylenedioxy-$\Delta^{5(10)}$-pregnen-3β-ol 3-acetate was replaced by the remaining 3-acetates of Example IV hereinabove. In each case, the corresponding free 3β-ol, namely, B-homo-19-nor-20-cycloethylenedioxy - $\Delta^{5(10)}$-pregnene-3β,17α-diol, B-homo-16α - methyl - 19 - nor - 20 - cycloethylenedioxy - $\Delta^{5(10)}$-pregnen-3β-ol, B-homo-16β-methyl-19-nor-20-cycloethylenedioxy - $\Delta^{5(10)}$pregnen - 3β - ol, B-homo-16α-methyl-19-nor - 20 - cycloethylenedioxy - $\Delta^{5(10)}$ - pregnene - 3β,17α-diol, and B-homo-16α,17α-isopropylidenedioxy-19-nor-20-cycloethylenedioxy - $\Delta^{5(10)}$ - pregnen-3β - ol, respectively, were obtained.

Example VI

B - homo - 19 - nor - 20 - cycloethylenedioxy - $\Delta^{5(10)}$-pregnen-3β-ol was oxidized, using chromium trioxide in pyridine, in the manner described in Example II hereinabove, thus giving B-homo-19-nor-20-cycloethylenedioxy-$\Delta^{5(10)}$-pregnen-3-one.

By repeating this procedure using the remaining free 3β-ols prepared as described in Example V hereinabove as the steroid starting materials, the corresponding 3-ones, namely, B-homo-19-nor-20-cycloethylenedioxy-$\Delta^{5(10)}$-pregnen-17α-ol-3-one, B-homo-16α-methyl-19-nor-20-cycloethylenedioxy-$\Delta^{5(10)}$-pregnen-3-one, B-homo-16β-methyl - 19 - nor - 20 - cycloethylenedioxy - $\Delta^{5(10)}$ - pregnen - 3 - one, B - homo-16α-methyl-19-nor-20-cycloethylenedioxy-$\Delta^{5(10)}$-pregnen-17α-ol-3-one, and B-homo-16α-17α - isopropylidenedioxy - 19 - nor - 20 - cycloethylenedioxy-$\Delta^{5(10)}$-pregnen-3-one respectively, were obtained.

Example VII

A solution of 2 grams of B-homo-19-nor-20-cycloethylenedioxy-$\Delta^{5(10)}$-pregnen-3-one in 70 cc. of methanol containing 7 ml. of aqueous 8% sulfuric acid was refluxed for 40 minutes. Following this reaction period the reaction mixture was neutralized by the addition of aqueous saturated sodium carbonate solution, then concentrated to about 20 ml. under vacuum and poured into water. The thus-formed precipitate was collected by filtration and washed thoroughly with water. Recrystallization from acetone gave B-homo-19-nor - $\Delta^4$- pregnene-3,20-dione.

By repeating this procedure using the remaining 3-ones prepared as described in Example VI hereinabove, as the steroid starting materials, the corresponding $\Delta^4$-3,20-diones, namely, B-homo-19-nor-$\Delta^4$-pregnen-17α-ol-3,20-dione, B - homo - 16α - methyl - 19-nor-$\Delta^4$-pregnene-3,20-dione, B - homo - 16β - methyl - 19-nor-$\Delta^4$-pregnene-3,20-dione, B - homo-16α-methyl-19-nor-$\Delta^4$-pregnen-17α-ol-3,20-dione, and B-homo-16α,17α-isopropylidenedioxy-19-nor-$\Delta^4$-pregnen-3,20-dione, respectively, were obtained.

Example VIII

B - homo - 19 - nor - 20 - cycloethylenedioxy - $\Delta^{5(10)}$-pregnen-3β-ol was refluxed with sulfuric acid in methanol in the manner described in Example VII hereinabove to give B-homo-19-nor-$\Delta^{5(10)}$-pregnen-3β-ol-20-one.

By repeating this procedure using the remaining 20-cycloethylenedioxy-3β-ols prepared as described in Example V hereinabove, the corresponding 3β-ol-20-ones, namely, B - homo - 19-nor-$\Delta^{5(10)}$-pregnene-3β,17α-diol-20-one, B - homo-16α-methyl-19-nor-$\Delta^{5(10)}$-pregnen-3β-ol-20-one, B - homo-16β-methyl-19-nor-$\Delta^{5(10)}$-pregnen-3β-ol-20-one, B - 16α - methyl - 19 - nor - $\Delta^{5(10)}$ - pregnene - 3β,17α - diol - 20 - one, and, B-homo-16α,17α-isopropylidenedioxy-19-nor-$\Delta^{5(10)}$-pregnen-3β-ol, respectively, were obtained.

Example IX

B - homo - 19-nor-$\Delta^{5(10)}$-pregnen-3β-ol-20-one was oxidized, using chromium trioxide in pyridine, in the manner described in Example II hereinabove, to give B-homo-19-nor-$\Delta^{5(10)}$-pregnene-3,20-dione.

This procedure was then repeated in every detail but one, namely, the remaining 3β-ol-20-ones prepared as described in Example VIII hereinabove were used as the steroid starting materials. In each case, the corresponding 3,20-dione, namely, B-homo-19-nor-$\Delta^{5(10)}$-pregnen-17α-ol-3,20-dione, B-homo-16α-methyl-19-nor-$\Delta^{5(10)}$-pregnene-3,20-dione, B-homo-16β-methyl-19-nor-$\Delta^{5(10)}$-pregnen-17α-ol-3,20-dione, and B-homo-16α,17α-isopropylidenedioxy-19-nor-$\Delta^{5(10)}$-pregnene-3,20-dione, respectively, were obtained.

Example X

To a solution of 2.5 grams of B-homo-19-nor-$\Delta^{5(10)}$-pregnene - 3,20 - dione in 25 cc. of methylene dichloride, maintained at −5° C., there was added dropwise over a 30 minute period, with stirring, a solution of 2 grams of bromine in 25 cc. of methylene dichloride. The resulting reaction mixture was allowed to stand at 0° C. for 5 minutes, then poured into an aqueous 5% sodium bicarbonate solution and extracted with methylene dichloride. The thus-obtained extract was washed with water, dried over anhydrous sodium sulfate and evaporated to dryness. Crystallization from acetone/hexane gave B-homo-5α,10β-dibromo-19-nor-pregnane-3,20-dione.

By repeating this procedure in every detail but one, namely, using the remaining 3,20-diones prepared as described in Example IX hereinabove, the corresponding 5α,10β-dibromo steroids, namely, B-homo-5α,10β-dibromo-19-nor-pregnan-17α-ol-3,20-dione,
B-homo-5α,10β-dibromo-16α-methyl-19-nor-pregnane-3,20-dione,
B-homo-5α,10β-dibromo-16β-methyl-19-nor-pregnane-3,20-dione,
B-homo-5α,10β-dibromo-16α-methyl-19-nor-pregnan-17α-ol-3,20-dione, and
B-homo-5α,10β-dibromo-16α,17α-isopropylidenedioxy-10-nor-pregnane-3,20-dione, respectively, were obtained.

Example XI

One gram of B-homo-5α,10β-dibromo-19-nor-pregnane-3,20-dione was dissolved in 100 mg. of anhydrous, redistilled pyridine, and the resulting reaction mixture was then allowed to stand at room temperature, with stirring overnight. Following this reaction period the reaction mixture was diluted with water and extracted with methylene dichloride/diethyl ether (1:1 by volume). The resulting extract was washed successively with 1 N hydrochloric acid, an aqueous 1 N sodium hydroxide solution, and then with water until neutral. Next, the neutral solution was dried over anhydrous sodium sulfate and evaporated to dryness under vacuum. Recrystallization from acetone gave B-homo-19-nor-Δ$^{4,9(10)}$-pregnadiene-3,20-dione.

This procedure was then repeated in every detail but one, namely, B-homo-5α,10β-dibromo-19-nor-pregnane-3,20-dione was replaced by the remaining 5α,10β-dibromo intermediates prepared as described in Example X hereinabove. In each case, the corresponding Δ$^{4,9(10)}$-diene, namely, B-homo-19-nor-Δ$^{4,9(10)}$-pregnadiene-17α-ol-3,20-dione,
B-homo-16α-methyl-19-nor-Δ$^{4,9(10)}$-pregnadiene-3,20-dione,
B-homo-16β-methyl-19-nor-Δ$^{4,9(10)}$-pregnadiene-3,20-dione,
B-homo-16α-methyl-19-nor-Δ$^{4,9(10)}$-pregnadien-17α-ol-3,20-dione, and
B-homo-16α,17α-isopropylidene-19-nor-Δ$^{4,9(10)}$-pregnadiene-3,20-dione, respectively, was obtained.

It will be obvious to those skilled in the art that other changes and variations can be made in carrying out the present invention without departing from the spirit and scope thereof as defined in the appended claims.

I claim:
1. A compound represented by the formula:

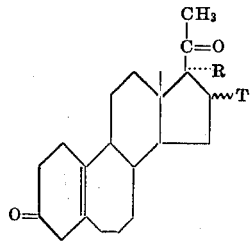

wherein R is selected from the group consisting of hydrogen, hydroxyl and a hydrocarbon carboxylic acyloxy group containing less than 12 carbon atoms; T is selected from the group consisting of hydrogen, α-hydroxyl, α-hydrocarbon carboxylic acyloxy containing less than 12 carbon atoms, α-methyl and β-methyl; and R and T taken together represent the grouping:

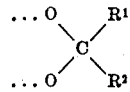

wherein $R^1$ is selected from the group consisting of hydrogen and lower alkyl and $R^2$ is selected from the group consisting of hydrogen, lower alkyl, and aryl containing up to 8 carbon atoms, inclusive.

2. B-homo-19-nor-Δ$^{5(10)}$-pregnene-3,20-dione.
3. B-homo-19-nor-Δ$^{5(10)}$-pregnen-17α-ol-3,20-dione.
4. B-homo-16α-methyl-19-nor-Δ$^{5(10)}$-pregnene-3,20-dione.
5. B-homo-16β-methyl-19-nor-Δ$^{5(10)}$-pregnene-3,20-dione.
6. B-homo-16α-methyl-19-nor-Δ$^{5(10)}$-pregnen-17α-ol-3,20-dione.
7. B-homo-16α,17α-isopropylidenedioxy-19-nor-Δ$^{5(10)}$-pregnene-3,20-dione.
8. A compound represented by the formula:

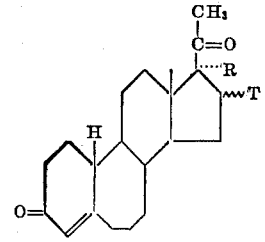

wherein R is selected from the group consisting of hydrogen, hydroxyl and a hydrocarbon carboxylic acyloxy group containing less than 12 carbon atoms; T is selected from the group consisting of hydrogen, α-hydroxyl, α-hydrocarbon carboxylic acyloxy containing less than 12 carbon atoms, α-methyl and β-methyl; and R and T taken together represent the grouping:

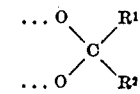

wherein $R^1$ is selected from the group consisting of hydrogen and lower alkyl and $R^2$ is selected from the group consisting of hydrogen, lower alkyl, and aryl containing up to 8 carbon atoms, inclusive.

9. B-homo-19-nor-Δ$^4$-pregnene-3,20-dione.
10. B-homo-19-nor-Δ$^4$-pregnen-17α-ol-3,20-dione.
11. B-homo-16α-methyl-19-nor-Δ$^4$-pregnene-3,20-dione.
12. B-homo-16β-methyl-19-nor-Δ$^4$-pregnene-3,20-dione.
13. B-homo-16α-methyl-19-nor-Δ$^4$-pregnen-17α-ol-3,20-dione.
14. B - homo - 16α,17α-isopropylidenedioxy-19-nor-Δ$^4$-pregnene-3,20-dione.
15. A compound represented by the formula:

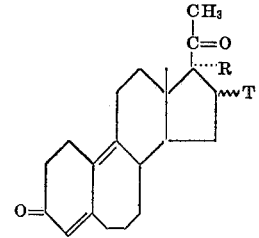

wherein R is selected from the group consisting of hydrogen, hydroxy and a hydrocarbon carboxylic acyloxy group containing less than 12 carbon atoms; T is selected from the group consisting of hydrogen, α-hydroxyl, α-hydrocarbon carboxylic acyloxy containing less than 12 carbon atoms, α-methyl and β-methyl, and R and T taken together represent the grouping:

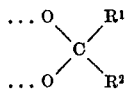

wherein $R^1$ is selected from the group consisting of hydrogen and lower alkyl and $R^2$ is selected from the group consisting of hydrogen, lower alkyl, and aryl containing up to 8 carbon atoms, inclusive.

16. B-homo-19-nor-$\Delta^{4,9(10)}$-pregnadiene-3,20-dione.
17. B - homo - 19-nor-$\Delta^{4,9(10)}$-pregnadien-17α-ol-3,20-dione.
18. B - homo - 16α-methyl-19-nor$\Delta^{4,9(10)}$-pregnadiene-3,20-dione.
19. B - homo - 16β-methyl-19-nor-$\Delta^{4,9(10)}$-pregnadiene-3,20-dione.
20. B-homo-16α-methyl-19-nor-$\Delta^{4,9(10)}$-pregnadien-17α-ol-3,20-dione.
21. B-homo - 16α,17α - isopropylidenedioxy - 19 - nor-$\Delta^{4,9(10)}$-pregnadiene-3,20-dione.

References Cited

UNITED STATES PATENTS 3,138,635   6/1964   Muller et al. _____ 260—488

OTHER REFERENCES

Carpio et al.: "Journal of Organic Chemistry," vol. 30(12), 1965, pp. 4154–59.

NICHOLAS S. RIZZO, *Primary Examiner.*

J. H. TURNIPSEED, *Assistant Examiner.*

UNITED STATES PATENT OFFICE
CERTIFICATE OF CORRECTION

Patent No. 3,410,872                                  November 12, 1968

John A. Edwards

It is certified that error appears in the above identified patent and that said Letters Patent are hereby corrected as shown below:

Column 1, line 38, "18-nor" should read -- 19-nor --. Column 2, that portion of formula II reading "$R^3C$-" should read -- $R^3O$- --. Column 8, line 53, "B-16α" should read -- B-homo-16α --; line 69, "nen-17α-ol-3,20-dione" should read -- nene-3,20-dione, B-homo-16α-methyl-19-nor-$\Delta^{5(10)}$-pregnen-17α-ol-3,20-dione --. Column 9, line 24, "10-nor" should read -- 19-nor --.

Signed and sealed this 10th day of March 1970.

(SEAL)
Attest:

Edward M. Fletcher, Jr.                        WILLIAM E. SCHUYLER, JR.
Attesting Officer                                     Commissioner of Patents